May 8, 1962  C. E. HURLBURT  3,032,886
MEANS FOR EFFECTING TRIM ADJUSTMENT IN A GYROSCOPIC
HORIZON WITH NATURAL SPHERICAL INDICATION
Filed Jan. 15, 1960  2 Sheets-Sheet 1

INVENTOR.
CHARLES E. HURLBURT
BY Herbert L. Davis
ATTORNEY

INVENTOR.
CHARLES E. HURLBURT
BY Herbert L. Davis
ATTORNEY

United States Patent Office
3,032,886
Patented May 8, 1962

3,032,886
MEANS FOR EFFECTING TRIM ADJUSTMENT IN A GYROSCOPIC HORIZON WITH NATURAL SPHERICAL INDICATION
Charles E. Hurlburt, River Edge, N.J., assignor to The Bendix Corporation, a corporation of Delaware
Filed Jan. 15, 1960, Ser. No. 2,730
9 Claims. (Cl. 33—204)

The invention relates to a novel means for effecting trim adjustment in a gyroscopic horizon with natural spherical indication and more particularly to novel means for effecting a trim adjustment in a self-contained gyro indicator of a type such as disclosed and claimed in the U.S. Patent No. 2,912,766, granted November 17, 1959, to Charles E. Hurlburt and assigned to Bendix Aviation Corporation, the assignee of this invention.

As disclosed in the aforenoted patent, such a gyro indicator may embody a gear on the horizontal axis of the gyro which meshes with a second gear for actuating an indicating sphere so as to obtain a reversal of motion and presentation of the spherical indication in the proper sense.

An object of the present invention is to provide novel means for adjusting the first mentioned gear on the horizontal axis of the gyro so that a given gyro position will accomplish different positions of the sphere with relation to a fixed case reference or conversely a zero sperical reading may be accomplished against a fixed reference for various gyro housing positions by appropriate adjustment of a gyro housing position transmitting gear on the horizontal axis of the gyro.

In prior devices, the method of trim adjustment has generally been that of moving in some manner the reference bar on the casing in relation to the spherical indications. Such means of trim adjustment has several disadvantages, among which are:

(1) At times of extreme pitch trim, as in carrier landings, etc., the reference is near the bottom of the visible reading area. This is an unfortunate place to use as a reference when motion both above and below the reference must be observed.

(2) A common use of this type of instrument may be as a "standby" in single seater aircraft or for co-pilot use in larger aircraft. In either event it would be used with or near a repeater controlled by a remote vertical gyro transmitter. In such repeater, trim adjustment is usually accomplished by having the reference means fixed to the case and the trim adjustment added as a signal which drives the indicating means (spheroid, oblate spheroid, or some approximation of either) to the desired location. By this means the reading is always at the center of the visible reading area. The use of a "standby" or co-pilot instrument with indicating means dissimilar from that of the regular or pilots instrument is not desirable.

Therefore, an object of the invention is to provide a novel means for trim adjustment in a self-contained gyro indicator which is completely compatible with that used in remote indicators.

Another object of the invention is to provide novel means to remotely position and lock the drive linking the gyro and sphere and by so doing change the relative position of the sphere with relation to the gyro while retaining the reference bar in a fixed position on the instrument casing.

Another object of the invention is to provide in a gyro indicator instrument an operator-operative knob having movement in one sense, such as an axial in and out motion, to actuate a switch controlling a solenoid to effect the aforenoted trim adjustment of the sphere relative to a reference bar, while in addition the knob has a movement in another sense, such as a rotary motion, to operate a controlling drive for positioning the reference bar in cooperative relation with the trim adjustment of the sphere relative to the reference bar.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
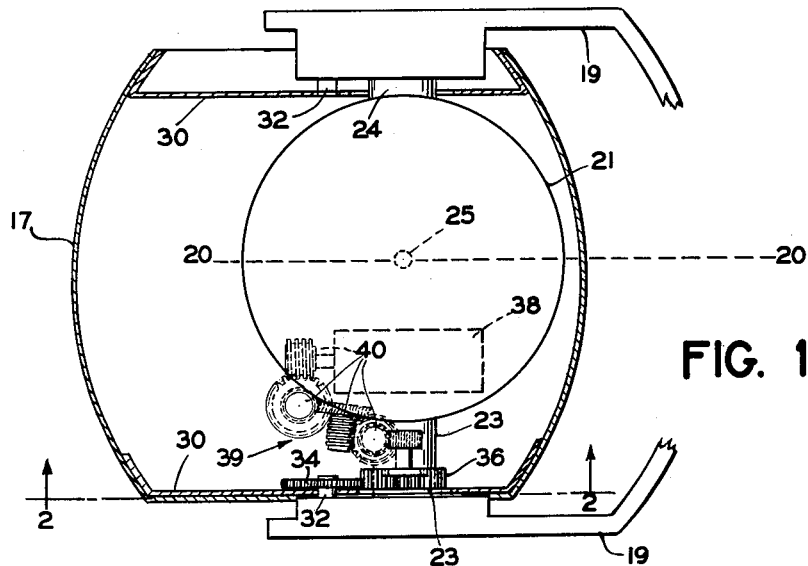
FIGURE 1 is a fragmentary plan view of a gyroscopic instrument embodying the invention, with parts cut away and certain parts shown in section for better illustration thereof.
Figure 2:
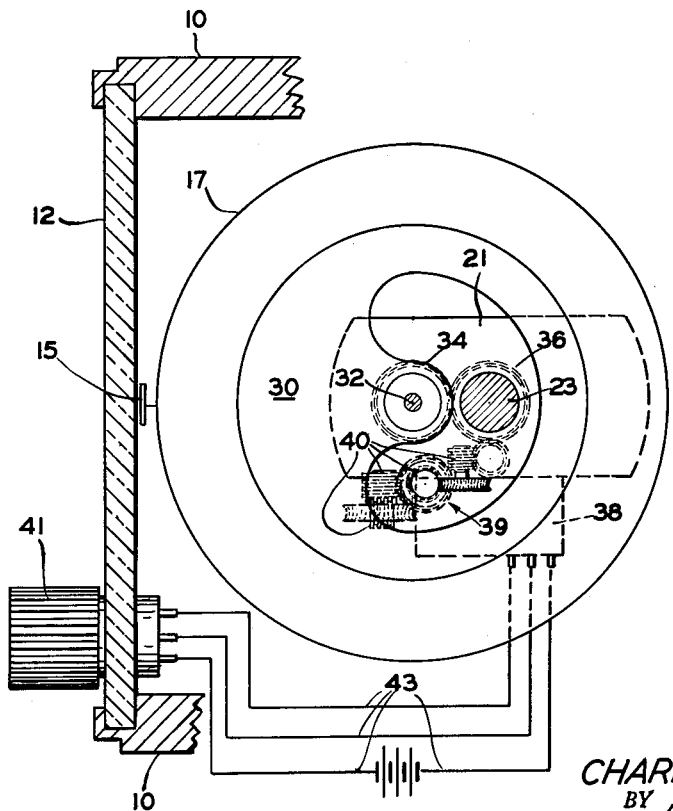
FIGURE 2 is a sectional view of the assembly of FIGURE 1 taken along the lines 2—2 of FIGURE 1 and shown in assembled relation in a fragmentary portion of the instrument casing.

Reference is now directed to the drawings of FIGURES 1 and 2 wherein the invention is shown as applied to a gyro indicator instrument of the type disclosed in the aforenoted U.S. Patent No. 2,912,766 and including an elongated can or casing 10 in which the gyro is contained and having its open or viewing end closed by a vertically disposed bezel window indicated in FIGURE 2 by the numeral 12. Rearwardly of the window is affixed an attitude or reference bar 15 which is supported from the wall of the instrument casing 10 as disclosed in the aforenoted patent.

Further, the can or casing 10 is intended to be fixed in the instrument panel of an aircraft in a level position and so that the window 12 of the instrument fronts the panel. In close proximity to the rear of the bezel window 12 is a truncated spherical shell 17 of very light weight material such a aluminum. The upper half of the face portion of the sphere may be suitably colored as grey or blue to indicate the sky, while the lower half of the sphere may be suitably colored as black or brown to indicate the earth. The division point of the colored sections provides a horizon line which has a normal position when the instrument is level coinciding with the attitude or reference bar 15.

The truncated sphere 17 functions to roll or rotate on a horizontal axis as the plane pitches so as to indicate climbing and diving attitudes of the plane, as explained in the aforenoted patent. Lateral markings in contrasting colors on the respective colored areas of the sphere 17 serve to indicate the degree of pitch relative to the attitude or reference bar 15 as the sphere rolls on its horizontal axis.

Rotation of the sphere 17 is gyro controlled. The gyroscope mechanism for this purpose is housed in the can or casing 12 of the instrument, and only so much thereof as is believed necessary to illustrate the invention herein has been shown in the drawings. It includes an outer gimbal member, portions of which have been indicated by the numeral 19 and which member has provided a longitudinal axis indicated by the dotted line extension 20—20 and defined by an elongated shaft, not shown, axially mounted in suitable housing supported bearings for 360° rotation, as explained in the aforenoted patent.

Located within the sphere 17 is a vertical gyro, the bearing frame or casing of which is indicated by numeral 21. The horizontal axis of the gyro bearing frame 21 is defined by trunnions 23 and 24 which project from opposite sides of the outer gimbal member 19 through open sides of the sphere 17. These trunnions 23 and 24 are supported for rotation in suitable bearings carried in the arms of the outer gimbal member 19. The structure of the gyro 21, not being necessary to an understanding of this invention, will be assumed to be electrically driven and to have a spin axis 25 which is normally vertical to the horizontal axis of the gyro bearing frame 21. The line extension 20—20 of the longitudinal axis of the shaft of the gimbal member 19 is perpendicular to the horizontal axis of the trunnions 23 and 24.

The sphere 17 is mounted upon a pair of opposed brackets 30, each of which supports the sphere 17 in its interior forward and polar regions. Each of the brackets 30 pivot on a pin 32 which projects inwardly from each gimbal arm 19. These pins 32 are located forwardly of the gyro frame trunnions 23 and 24 and are in close spaced relation thereto. The pivot pins 32 define a horizontal axis for the pivotal movement of the sphere 17.

A gear 34, coaxial with the pivot pins 32 of bracket 30, is pivotally mounted on one of the pins 32 and affixed to bracket 30. The gear 34 is in turn enmeshed with a gear 36 rotatably mounted on the trunnion 23 of the gyro bearing frame 21. The arrangement of the gear 36 in relation to the trunnion 23 is such that the gear 36 may be rotated upon the trunnion 23 by a reversible motor 38 of conventional type carried by the casing 21 of the vertical gyro.

The motor 38 drives the gear 36 through a gear train 39 carried by the gyro bearing casing 21 and including suitable speed reduction worm gears 40 for adjustably positioning the gear 36 and holding the gear 36 in its adjusted position relative to the gyro bearing casing 21. The weight of the gear train 39 and motor 38 is counterbalanced in the gyro casing 21 by a suitable weighted member not shown. Electrical energization of the reversible motor 38 to effect rotation of the gear train 39 and thereby gear 36 in the proper direction is controlled by a suitable operator-operative switch mechanism 41 of conventional type suitably electrically connected, as shown diagrammatically in FIGURE 2, through conductors 43 to the motor 38 so as to control the operation and direction of rotation thereof.

Reading of the reference markings upon the sphere 17 is effected against the attitude or reference bar 15 which is fixed with relation to the instrument casing 10. Thus, upon suitable operation of the control switch 41, the sphere 17 may be adjusted to the position relative to the gyro bearing casing 21 to provide the trim adjustment required. The motor 38, as thus controlled by the operator-operative switch mechanism 41, drives through the gear train 39 the gear 36 which in turn adjustably positions through gear 34 the relative position of the sphere 17. The gear train 39 includes the speed reduction worm gears 40 or other suitable gear elements arranged so as to be driven only from that end of the gear train 39 driven by the motor 38 and so arranged that gear 36 as positioned by the motor 38 will be held in its adjusted position relative to the gyro bearing casing 21 by the interlocking irreversible action of the speed reduction worm gears 40.

The arrangement is such that movement of the gyro bearing casing 21 relative to the horizontal position will cause the gear 36, fixed in relation to the casing 21 by the adjusted position of the gear train 39, to cause the sphere 17, drivingly connected to the gear 36 through the gear 34, to pivot about pin 32 in inverse relationship to the movement of the gyro bearing casing 21 relative to the horizontal position.

Thus, upon the aircraft going into a climb, the sphere 17, as explained in the aforenoted patent, will pivot about gear 36 in a downward or counterclockwise direction, as viewed in FIGURE 2, causing the horizontal line to descend below the attitude bar 15, while upon the aircraft going into a dive, the sphere 17 will pivot about the gear 36 in an upward or clockwise direction causing the horizontal line to rise above the attitude bar 15. It is plain that by this arrangement, the earth colored portion of the sphere will appear to rise to meet the pilot as he dives and will appear to drop away as the pilot climbs. The degree that the sphere is pivoted above or below the attitude bar is indicated to the pilot by the latitude markings on the face of the sphere as well as the sky or earth portion of the sphere exposed through the window.

Furthermore, by adjustably positioning the gear 36 on the trunnion 23 and thereby the relationship of the gyro housing 21 to the sphere 17 and accordingly its position relative to the attitude or reference bar 15, a given position of the gyro bearing housing 21 may effect different indications of the sphere 17 relative to the fixed attitude or reference bar 15 or conversely a zero spherical reading may be accomplished against a fixed attitude or reference bar 15 position for various positions of the gyro bearing casing 21 by the appropriate positioning of the gear 36 through the gear train drive 39. Thus, the motor 38 and gear train drive 39 carried by the rotor case 21 is interposed in the gearing or motion transmitting mechanism 34 and 36 through the positioning of the gear 36. The gear 36 may be adjustably positioned on the trunnion 23 by operation of the motor 38 for selectively imparting an additional pivotal movement through the motion transmitting mechanism 34 and 36 to the sphere or body 17 so as to adjust the position of the spherical body 17 relative to the rotor case 21. In this manner, trim adjustment may be effected by appropriate manipulation of the operator-operative switch mechanism 41 so as to remotely adjust and lock the drive linking the gyro 21 and sphere 17 and thereby the position of the sphere 17 with relation to the gyro bearing casing 21.

Figure 3:
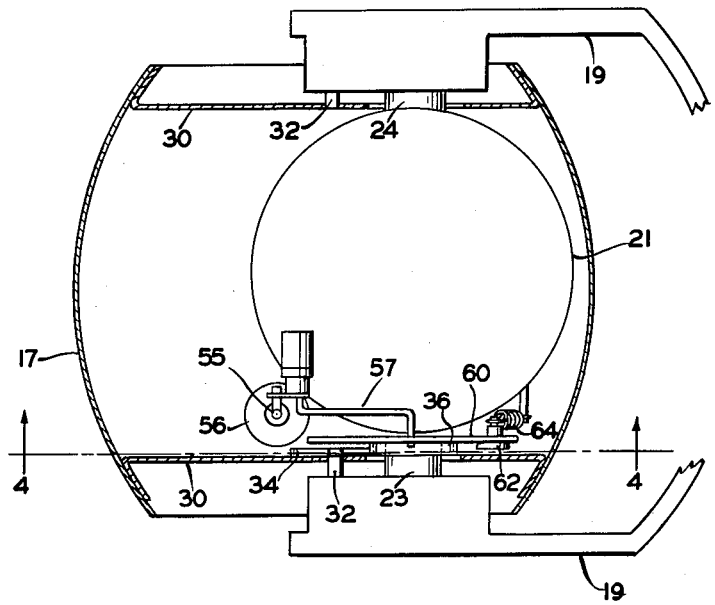
FIGURE 3 is a fragmentary plan view of a gyroscopic instrument embodying a second form of the invention, with parts cut away and certain parts shown in section for better illustration thereof.
Figure 4:
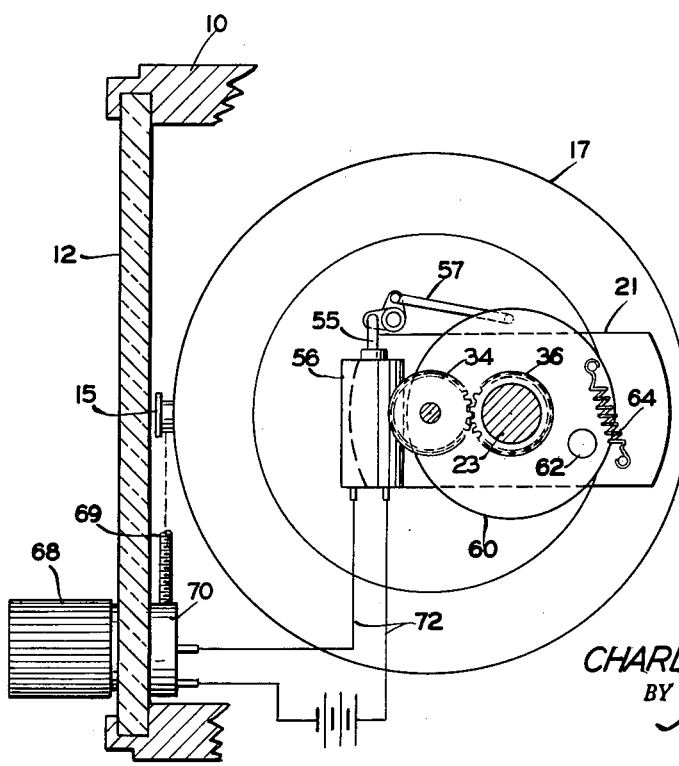
FIGURE 4 is a sectional view of the assembly of FIGURE 3 taken along the lines 4—4 of FIGURE 3 and shown in assembled relation in a fragmentary portion of the instrument casing.

A second form of the invention is illustrated in FIGURES 3 and 4, in which corresponding parts to those heretofore described with reference to the invention of FIGURES 1 and 2 have been indicated by like numerals. In the form of the invention of FIGURES 3 and 4, the gear 36 is rotatable no the trunnion 23 by operation of a plunger 55 of a solenoid 56. The solenoid 56 is carried by the gyro bearing casing 21 and the plunger 55 upon energization of the solenoid 56 is actuated so as to drive through a linkage 57 a disc-like member 60 to which the gear 36 is fastened. The motion imparted to the plunger 55 upon energization of the solenoid 56 is transmitted through the linkage 57 and the mass shift resulting from the change in position of the plunger 55 of the solenoid 56 is compensated by a weight 62 mounted on the disc 60.

Thus, the solenoid 56, linkage 57 and disc-like member 60 carried by the rotor case 21 is interposed in the gearing or motion transmitting mechanism 34 and 36 through the positioning of the gear 36 to which the disc-like member 60 is fastened. The gear 36 may be adjustably positioned on the trunnion 23 by the operation of the plunger 55 of the solenoid 56 for selectively imparting an additional pivotal movement through the motion transmitting mechanism 34 and 36 to the sphere or body 17 so as to adjust the position of the spherical body 17 relative to the rotor case 21. Moreover in the second form of the invention, illustrated in FIGURES 3 and 4, the gear 36 is in one or the other of two positions relative to the gyro bearing casing 21. When the solenoid 56 is deenergized, a spring 64 connected at one end to the gyro bearing casing 21 and at the opposite end to the disc 60 holds the gear 36 in one position determined by appropriate stops provided in the solenoid 56. When solenoid 56 is energized the linkage 57 actuated by the solenoid 56 pulls the disc 60 and thereby the gear 36, as viewed in FIGURE 4, in a counterclockwise direction to a second position, as determined by appropriate stops in the solenoid 56 serving to limit thereof in the counterclockwise or energized direction. Reading of the sphere 17 may be effected by reference markings upon the sphere 17, as applied against the attitude or reference bar 15, which may be adjusted to a fixed position with relation to the gyro bearing casing 21.

In the form of the invention illustrated in FIGURES 3 and 4, the attitude or reference bar 15 may be adjustably positioned relative to the window 12 by a screw shaft 69, chain drive or other conventional drive, such as described, for example, in U.S. Patent No. 2,333,984, granted November 9, 1943, to Bert G. Carlson and which may be manually actuated through a knob 68 by the operator or pilot of the aircraft. In addition, the knob 68 may be of a conventional type arranged to have an in and out axial motion effective to open and close a switch mechanism 70 for controlling the energization of the solenoid 56 through suitable electrical conductors 72, as shown diagrammatically in FIGURE 4.

In the aforenoted arrangement inasmuch as the sphere 17 is set in relation to the gyro bearing casing 21 in either one or the other of two predetermined positions, the provision of solenoid 56 controlled by the knob 68 operated switch mechanism 70, effectively cuts in half the travel required by the manual adjustment of the reference or attitude bar 15 through the knob 68 and drive 69.

For example, if the requirement were that trim must be adjusted up "A" degrees and down "B" degrees without this availability of the two center positions, the attitude or reference bar 15 would have to be driven down "B" degrees, with the objection that this might result in an extremely low and poor position for reading. If the sphere is in either one of two positions, the required adjustment from these positions would not be as great as before.

Thus, a common requirement is that a reference be adjustable up 6° and down 18°, or a total adjustment of 24°. The down 18° is objectionable. However, if the solenoid actuated position of the sphere 17 is such that 12° down trim is accomplished with the zero reference on the sphere 17 centered on the attitude or reference bar 15, an additional 6° down trim is all that would be required to give satisfactory trim adjustment.

In the last illustration, the reference bar 15 need be adjusted only 6° below the center position versus 18° below the center position as normally required in prior devices. The total mechanical adjustment would then be only 12° versus 24° below. The second form of the invention may be used to meet space requirements that do not permit use of the motor plus gear train arrangement of FIGURES 1 and 2.

In either form of the invention disclosed in FIGURES 1 and 2 or FIGURES 3 and 4, the arrangement is such as to remotely position and lock the drive linking the gyro bearing casing 21 and sphere 17 and by so doing effect a trim adjustment of the relative position of the sphere 17 with relation to the gyro bearing casing 21.

Although only two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a horizon indicating gyro instrument of a type including a housing having therein a rotor case and supporting means to pivotally support said rotor case about mutually perpendicular axes, a body having a surface with pitch indicia thereon pivotally carried by said supporting means so as to move about an axis perpendicular to one of said axes, a reference bar carried by said housing in cooperative relation with said pitch indicia, and a motion transmitting mechanism for operatively connecting said rotor case to said body so as to impart pivotal movement to said body upon pivotal movement of said rotor case about another of said axes and relative to said supporting means; the improvement comprising means carried by said rotor case and interposed in the motion transmitting mechanism for selectively imparting an additional pivotal movement through said mechanism to said body so as to adjust the position of said body relative to said rotor case.

2. In a horizon indicating gyro instrument of a type including a housing having therein a rotor case and supporting means to pivotally support said rotor case about major and minor mutually perpendicular axes, a body having a surface with pitch indicia thereon pivotally carried by said supporting means so as to move about an axis perpendicular to said major axis, a reference bar carried by said housing in cooperative relation with said pitch indicia, and a motion transmitting mechanism for operatively connecting said rotor case to said body so as to impart pivotal movement to said body upon pivotal movement of said rotor case about said minor axis and relative to said supporting means; the improvement comprising motor means carried by said rotor case, means interposed in the motion transmitting mechanism and selectively driven by said motor means for imparting an additional pivotal movement to said body relative to the rotor case, and operator-operative means for controlling said motor means and thereby the position of said body relative to said rotor case and the position of the pitch indicia relative to said reference bar.

3. In a horizon indicating gyro instrument of a type including a housing having therein a rotor case and supporting means to pivotally support said rotor case about major and minor mutually perpendicular axes, a body having a surface with pitch indicia thereon pivotally carried by said supporting means so as to move about an axis perpendicular to said major axis, a reference bar carried by said housing in cooperative relation with said pitch indicia, and a motion transmitting mechanism for drivingly connecting said rotor case to said body so as to impart pivotal movement to said body upon pivotal movement of said rotor case about said minor axis and relative to said supporting means; the improvement comprising means interposed in the motion transmitting mechanism for selectively imparting an additional pivotal movement through said mechanism to said body so as to vary the position of said body relative to said rotor case 4. The combination defined by claim 3 in which said last mentioned means includes a reversible motor means carried by said rotor case, a gear train carried by said rotor case and operatively connecting said motor means to said motion transmitting mechanism so that operation of said motor means may adjustably position said body through said gear train in relation to said rotor case, said gear train including worm gear means for locking said body in an adjusted position relative to said rotor case upon cessation of operation of the motor means, and operator-operative means for controlling the operation of the motor means and thereby the position of said body relative to said rotor case and the position of the pitch indicia relative to said reference bar.

5. The combination defined by claim 3 in which said last mentioned means includes a disc-like member pivotally mounted on said rotor casing for movement about said minor axis, means operatively connecting said member to said reversing mechanism, a spring fastened at one end to said rotor casing and at the opposite end to said disc-like member to bias the disc-like member in one sense about said minor axis, a solenoid carried by said rotor casing, linkage means operatively connecting said solenoid to said disc-like member so that said disc-like member may be actuated by said spring in said one sense about said minor axis and in an opposite sense about said minor axis upon energization of said solenoid so as to vary the adjusted position of said body relative to said rotor case and thereby the position of the pitch indicia relative to said reference bar, and operator-operative means to control energization and deenergization of said solenoid.

6. The combination defined by claim 5 in which said operator-operative means includes means carried by the housing to adjustably position the reference bar in relation to said housing and thereby the position of the reference bar in relation to said pitch indicia for cooperating with the adjusted position of the pitch indicia relative to said reference bar effected through the energization and deenergization control of said solenoid by said operator-operative means.

7. In a horizon indicating gyro instrument of a type including a housing having therein a rotor case and supporting bracket arms to pivotally support said rotor case within said housing and about major and minor mutually perpendicular axes, a body member having a curved surface with pitch indicia thereon, said body member being pivotally supported by said bracket arms so as to be movable about a secondary axis extending in parallel relation to said minor axis, and a reference bar carried by said housing in cooperative relation with said pitch indicia; the improvement comprising a first gear affixed to said body member and movable about said secondary axis, a second gear in engaging relation with said first gear and pivotally mounted on one of said bracket arms so as to be movable about said minor axis, electric motor means carried by said rotor casing, motion transmitting means carried by the rotor casing for operatively connecting the motor means to said second gear for effecting upon energization of said motor means an adjustment of the position of said body member relative to said rotor casing, operator-operative means for controlling the energization and deenergization of said motor means, and said motion transmitting means including means for locking said body member in an adjusted position relative to said rotor case upon deenergization of said motor means whereupon said second gear imparts through said first gear a pivotal adjustment to the body member about said secondary axis upon pivotal movement of the rotor casing about said minor axis so as to vary the adjusted position of the pitch indicia of the body member relative to the reference bar carried by said housing.

8. The combination defined by claim 7 in which said motion transmitting means includes a gear train carried by said rotor case, said gear train including an input gear driven by said electric motor means, an output gear drivingly engaging said second gear so that upon energization of said motor means said gear train may adjustably position said body member relative to said rotor casing, and worm gear means intermediate said input and output gears for locking said body member in an adjusted position relative to said rotor case upon deenergization of said motor means.

9. The combination defined by claim 7 in which said motion transmitting means includes linkage means drivingly connecting said electric motor means to said second gear so that upon energization of said motor means said linkage means may adjustably position said second gear and thereby said body member to one position relative to said rotor casing, and spring means operatively connected between said rotor casing and second gear for biasing said second gear and thereby said body member to another position relative to said rotor casing upon deenergization of said motor means.

References Cited in the file of this patent

UNITED STATES PATENTS

| | | |
|---|---|---|
| 2,160,970 | Koster | June 6, 1939 |
| 2,245,478 | Jann et al. | June 10, 1941 |
| 2,333,984 | Carlson | Nov. 9, 1943 |
| 2,912,766 | Hurlburt | Nov. 17, 1959 |